(12) United States Patent
Bennett (10) Patent No.: US 7,162,422 B1
(45) Date of Patent: Jan. 9, 2007

(54) APPARATUS AND METHOD FOR USING USER CONTEXT INFORMATION TO IMPROVE N-BEST PROCESSING IN THE PRESENCE OF SPEECH RECOGNITION UNCERTAINTY

(75) Inventor: Steven M. Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 09/676,348

(22) Filed: Sep. 29, 2000

(51) Int. Cl.
*G10L 15/08* (2006.01)
*G10L 15/22* (2006.01)

(52) U.S. Cl. .................. 704/236; 704/252; 704/257

(58) Field of Classification Search ............... 704/231, 704/236, 240, 251, 252, 255, 257, 270, 275
See application file for complete search history.

(56) References Cited

U.S. PATENT DOCUMENTS

| | | | | |
|---|---|---|---|---|
| 5,615,296 A | * | 3/1997 | Stanford et al. | 704/270.1 |
| 5,625,748 A | * | 4/1997 | McDonough et al. | 704/251 |
| 5,797,123 A | * | 8/1998 | Chou et al. | 704/256.5 |
| 6,233,553 B1 | * | 5/2001 | Contolini et al. | 704/220 |
| 6,327,566 B1 | * | 12/2001 | Vanbuskirk et al. | 704/257 |
| 6,483,896 B1 | * | 11/2002 | Goldberg et al. | 379/88.01 |
| 6,553,345 B1 | * | 4/2003 | Kuhn et al. | 704/275 |
| 6,587,818 B1 | * | 7/2003 | Kanevsky et al. | 704/251 |
| 6,601,029 B1 | * | 7/2003 | Pickering | 704/257 |
| 6,631,346 B1 | * | 10/2003 | Karaorman et al. | 704/9 |
| 6,856,957 B1 | * | 2/2005 | Dumoulin | 704/257 |

\* cited by examiner

*Primary Examiner*—Martin Lerner
(74) *Attorney, Agent, or Firm*—Sharmini N. Green (57) ABSTRACT

The present invention provides a method and apparatus for using user-context information to improve N-best processing in the presence of speech recognition uncertainty. Once digitized voice data is received, the voice data is processed by a speech recognizer to determine one or more phrases recognized as the digitized voice data provided by the user based on the currently active recognition grammar. When more than one phrase is recognized as the digitized voice data provided by the user as a result of voice recognition uncertainty, user-specific context information is used to choose a recognized phrase from the one or more phrases recognized as the digitized voice data.

3 Claims, 7 Drawing Sheets

FIG. 7

APPARATUS AND METHOD FOR USING USER CONTEXT INFORMATION TO IMPROVE N-BEST PROCESSING IN THE PRESENCE OF SPEECH RECOGNITION UNCERTAINTY

FIELD OF THE INVENTION

The invention relates generally to the field of speech recognition. In particular, the invention relates to a method and apparatus for utilizing user-specific context information to improve perceived speech recognition performance in response to speech recognizer uncertainty.

BACKGROUND OF THE INVENTION

Speech recognizers that are used in telephony and command-and-control applications do not recognize all possible words. Rather, they recognize a relatively small vocabulary. This vocabulary is expressed to a speech recognition engine in the form of a grammar. Grammars are normally expressed in a syntax like Backus-Naur Form (BNF) or Java Speech Grammar Format (JSGF). An example grammar is shown below in a syntax similar to JSGF:

public<Command>=<Meeting.|<Email>
    <meeting>=Set up a meeting with <friend> on Monday
    <Friend>=Frank|Fred
    <Email>=Read my email.

This grammar describes 3 sentences:

(1) Set up a meeting with Fred on Monday.
(2) Set up a meeting with Frank on Monday.
(3) Read my email.

The speech recognition engine (recognizer) uses DSP algorithms to match what the user says to elements in the currently active recognition grammar. (Details regarding the process by which a recognizer performs this match are known to those skilled in the art, and therefore are not provided. Moreover, understanding of this part of the process is not necessary for an understanding of the present invention.)

Figure 1:
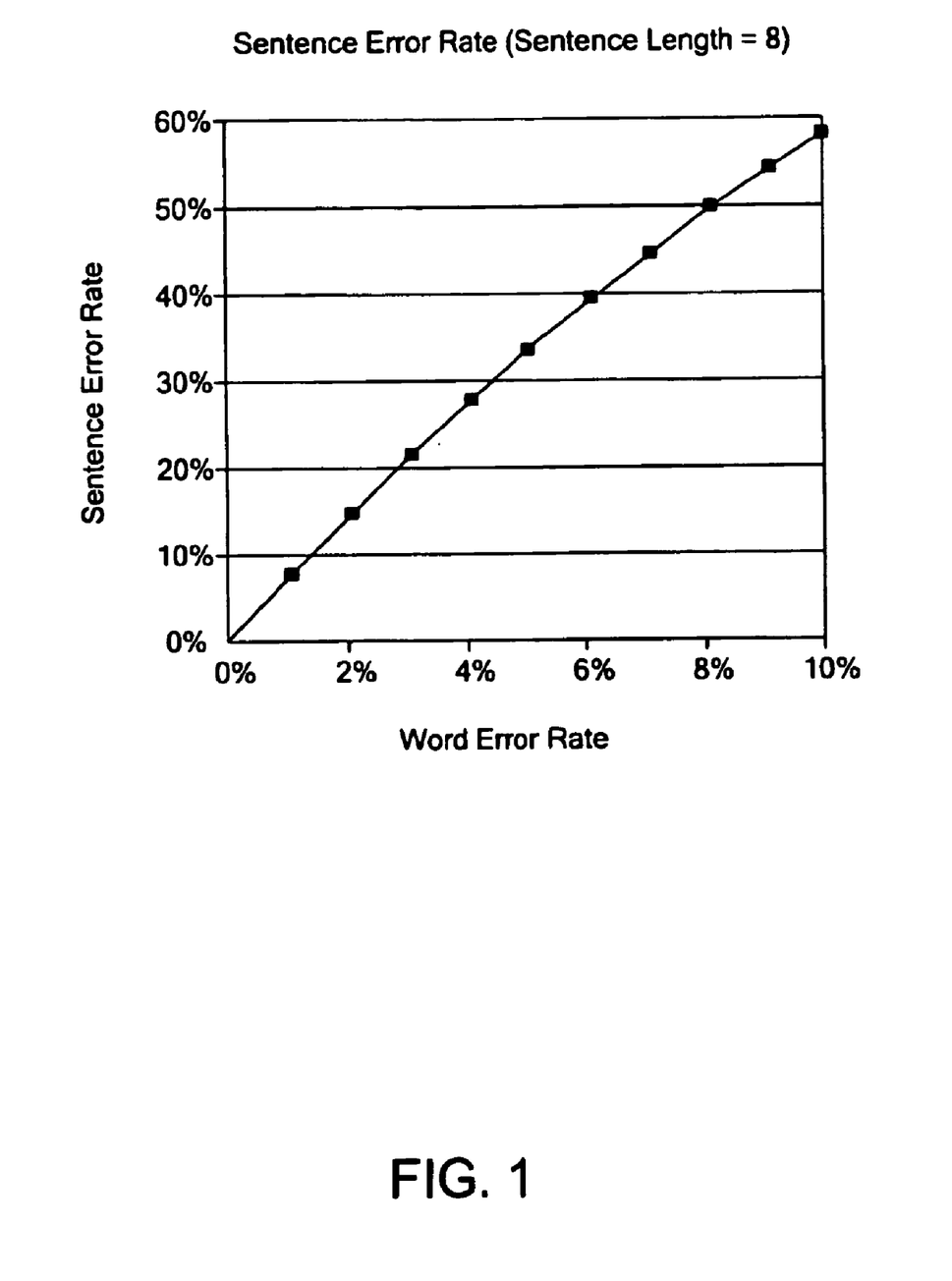
FIG. 1 depicts a chart illustrating a sentence error rate produced by prior art voice recognition systems.

Speech recognition by computer is far from perfect. Though word recognition rates are generally better than 90%, failures still occur quite often, particularly over sequences of words. For example, assuming a 95% word accuracy rate (or a 5% word error rate), the chance of an error in recognizing sentence number (1) is 100%−(95%^8)=34%, as depicted in FIG. 1. As the grammars involved become more complex, the recognition rates suffer. Moreover, recognition failures are both cumbersome and frustrating for the user, accounting for a large part of overall dissatisfaction with speech interfaces.

Many speech recognition engines support the concept of N-Best-style of voice recognition in response to voice recognition uncertainty. In this mode, the speech recognizer returns a list (up to N elements) that the user might have said, along with an indication of how confident the recognizer is of each potential match. The application software is then responsible for deciding which to use. For example, suppose that the currently active recognition grammar is the one described above. The user says "Set up a meeting with Fred on Monday". There is some noise on the line, causing the recognizer to not be certain whether the user said "Fred" or "Frank", but it matches everything else cleanly. The recognizer returns the sentences 1 and 2, indicating that they are equally likely. The application is now responsible for deciding how to respond.

An application may confirm and allow the user the chance to correct information extracted from the users speech. In many situations, this behavior will be required; in others it is optional or completely unnecessary.

Confirmation and correction may be explicit in a confirmation dialogue:

| | |
|---|---|
| U: | Schedule a meeting with Fred. |
| C: | I think that you said Fred. Is this correct? Please say yes or no. |
| U: | Yes. |
| C: | For when shall I schedule the meeting: |

Confirmation and correction may appear implicitly in other steps of the dialogue.

This style is harder to implement because the grammars can become large quickly.

| | |
|---|---|
| U: | Schedule a meeting with Fred. |
| C: | For when shall I schedule a meeting with Frank? |
| U: | No, I said Fred. |
| C: | For when shall I schedule the meeting with Fred? |

Confirmation and correction may be optional or not necessary at all. In this example, there is no confirmation or correction; the user simply queries the system again. A confirmation in this example would have made the interface much more cumbersome for the user because the recognition of the stock names is correct most of the time and the consequences of a recognition failure is very minor.

| | |
|---|---|
| U: | What is Nortel at today? |
| C: | Ortel is at 197, up 3. |
| U: | What is Nortel at today? |
| C: | Nortel Networks is at 134, up 2. |

Given the example grammar described in the introduction, the application must do one of the following:

1. Query the user if he said "Fred" or "Frank".
2. Cause a recognition failure and make the user repeat the command.
3. Decide that the user is more likely to have said "Fred".
4. Decide that the user is more likely to have said "Frank".

Option 1 requires the application to query the user. Implementation of option 1 requires the addition of a state to the recognition dialogue. This creates additional design, debug and maintenance cost and, from the user's viewpoint, makes the interface more clumsy (more steps to get the same work done).

Option 2 is an easier way out—no additional processing or dialogue definition is required, though the application must be designed to query the user to repeat the command. This functionality will be required anyway, to handle true recognition failures (if for example, the user said "What time is it?" which is not included in the grammar in any form or if there is significant noise on the line and the recognition process fails entirely). Like Option 1, the user is likely to experience frustration at having to repeat a command.

Options 3 and 4 require the application to guess about what the user said. Without some context information, there is no way for the application to choose between "Fred" and "Frank" if the speech recognizer is equally confident about the options.

Therefore, there remains a need to overcome the limitations in the above described existing art which is satisfied by the inventive structure and method described hereinafter.

BRIEF DESCRIPTION OF THE DRAWINGS

The present invention is illustrated by way of example, and not by way of limitation, in the figures of the accompanying drawings and in which.

DETAILED DESCRIPTION

The present invention overcomes the problems in the existing art described above by providing an apparatus and method for using user context information to improve N-best processing in the presence of speech recognition uncertainty. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

In the preferred embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD (compact disc)-ROMs (read only memories), and magneto-optical disks, ROMs, RAMs (Random access memories), EPROMs (erasable programmable read only memories), EEPROMs (electrically erasable programmable read only memories), magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 2:
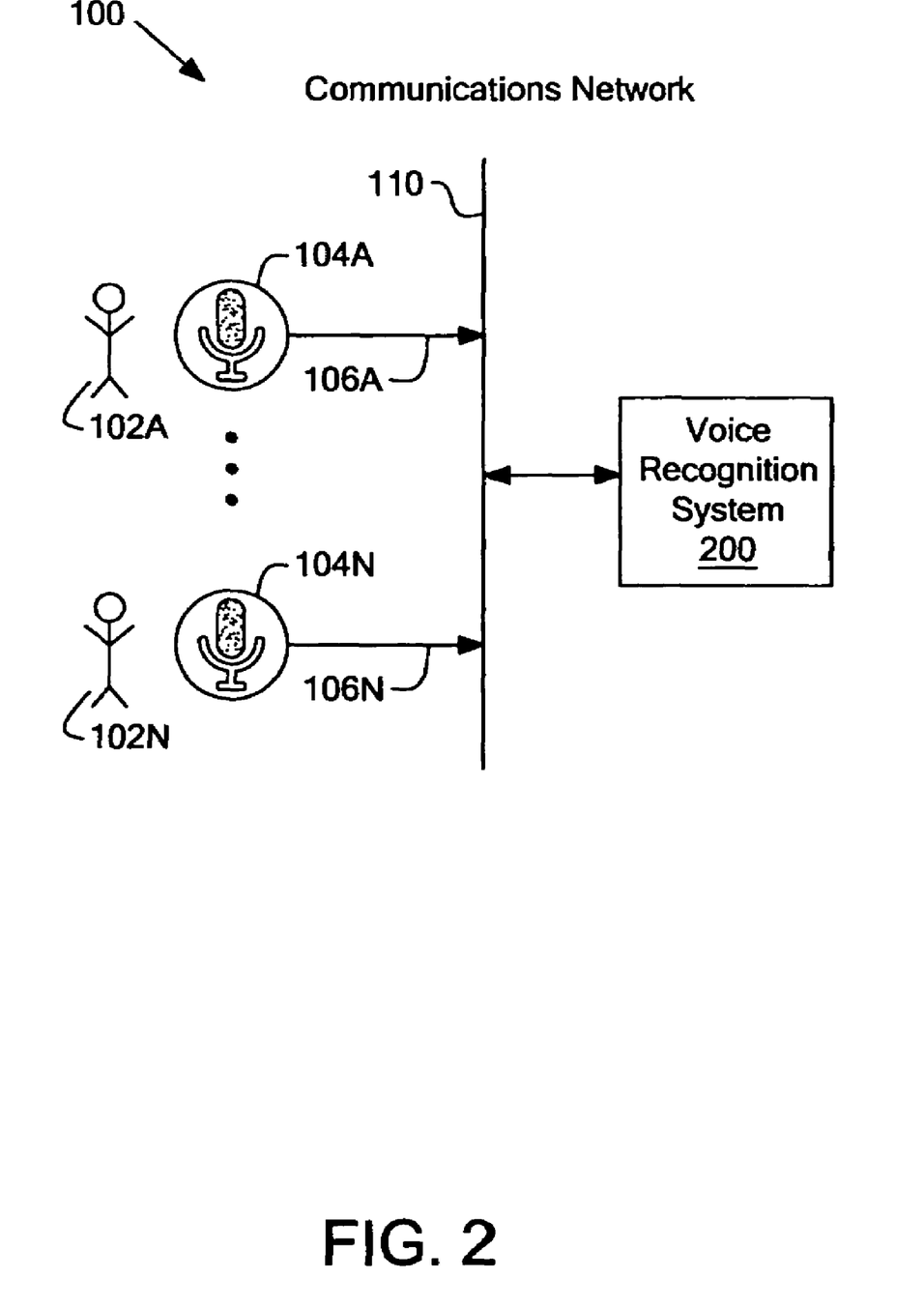
FIG. 2 is a block diagram illustrating a computer system in which the voice recognition system of the present invention may be implemented.

FIG. 2 illustrates a system 100 representing an embodiment of the present invention including a number of voice transmission mediums 104 (104A–104N) and a voice recognition system 200 in communication via a communications network 110. In a preferred embodiment, the voice recognition system 200 is a server computer that receives voice data 106 (106A–106N) from one or more users 102 (102A–102N). The voice data 106 is provided by a user 102 via the voice transmission medium 104 and received by the voice recognition system 200 via the communications network 110.

The communications network 110 generally refers to any type of wire or wireless link enabling the transmission of voice data such as, but not limited to, a public switch telephone network, a wireless communications network, a local area network, a wide area network or a combination of networks. The voice transmission medium 104 generally refers to any type of device capable of receiving speech from a user and providing the speech to a destination via a communications network such as the communications network 110. In a preferred embodiment of the present invention, the communications network is a public switch telephone network and the voice transmission medium is the telephone. However, it is within the contemplation of the present invention that the voice transmission medium is a microphone directly connected to the voice recognition system 200 such that the communications network 110 is any voice recognition interface. Additionally, the voice recognition system 200 may be distributed in arbitrary ways, across a network.

Figure 3:
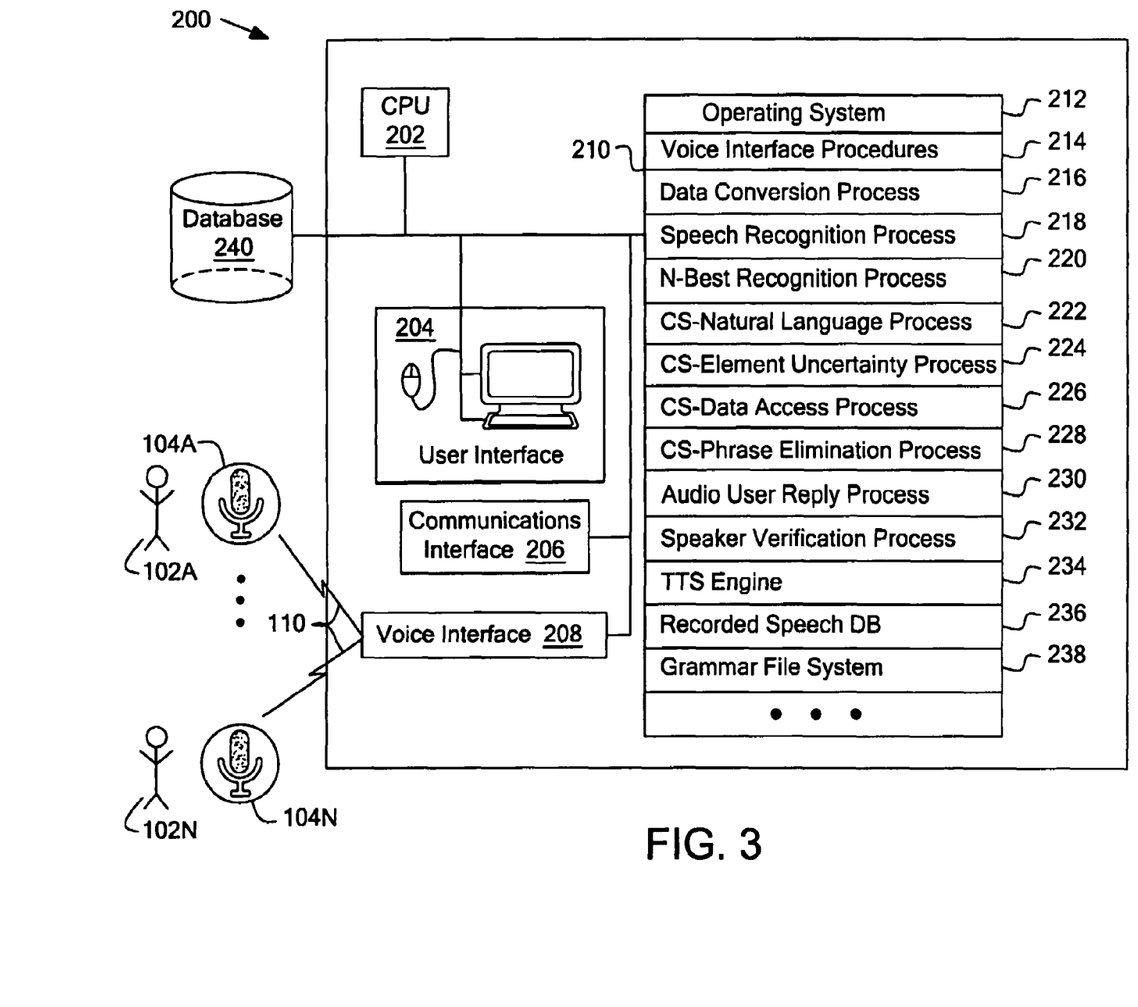
FIG. 3 is a block diagram further illustrating the voice recognition system as shown in FIG. 2.

FIG. 3 further illustrates the voice recognition system server computer 200 which includes a central processing unit (CPU) 202, a user interface 204, a communications interface 206, a voice interface 208 and a memory 210. The voice recognition server computer 200 can be any type of computing device such as, but not limited to, desktop computers, workstations, laptops and/or mainframe computers. The voice interface 208 is used to communicate with the users 102 as well as other system resources not shown. The voice interface 208 receives voice data 106 provided by a user 102 through a voice transmissions medium 104, which is provided over the communications network 110. The voice interface 208 provides digitized voice data to the voice recognition computer 200 for interactive voice recognition, including voice processing, speech recognition and text-to-speech processing. The memory 210 of the voice recognition server computer 200 may be implemented as volatile memory such as RAM (random access memory) or a combination of volatile and non-volatile memory, such as one or more magnetic disk storage units. The memory can contain any of the following:

an operating system 212;
voice interface procedures 214 for receiving the voice data 106 from the user 102 via the voice interface 208;
data conversion procedures 216 for converting analog voice data 106 received from the user 102 to a digitized format and converting digitized voice response data to an analog format prior to providing the voice response data to the user;

speech recognition procedures 218 for processing the voice data 106 to determine one or more phrases recognized as the digitized voice data 106 provided by the user 102 based on a currently active recognition grammar;

N-best recognition procedures 220 for receiving the voice data 106 provided by the user 102 and generate N-phrases recognized as the voice data 106, including a confidence value associated with each of the N-phrases recognized as the voice data 106 provided by the user 102;

context-sensitive (CS) natural language procedures 222 having the capability to select user-specific context information from a database 240 and use the user-specific context information to choose a recognized phrase from the one or more phrases recognized as the voice data 106 when the speech recognition procedure 220 recognizes more than one phrase as the voice data 106 provided by the user 102;

context-sensitive (CS) element uncertainty procedures 224 for selecting elements of uncertainty within the one or more recognized phrases generated by the speech recognition procedures 218;

context-sensitive (CS) data access procedures 226 for selecting user-specific context information from the database 240 based on the elements of uncertainty provided by the CS-element uncertainty procedures 226;

context-sensitive (CS) phrase elimination procedures 224 for removing phrases from the one or more phrases recognized by the speech recognition procedures 218 using the user-specific context information provided by the CS-data access procedures 226;

audio user-reply procedures 230 for providing audio responses from the voice recognition system 200 to the user 102 in response to the voice data 104 provided by the user 102;

speaker verification procedures 232 for verifying the identity of a user 102 providing voice data 104 to the voice recognition system 200;

a TTS engine 234 for converting text to audio utilized by the audio user reply procedures 230;

a recorded speech database 236 including audio commands and responses utilized by the audio user-reply procedures 230;

a grammar file system 238 including recognition grammar files used by the speech recognition procedures 218 to process the voice data 106 provided by the user 102; and other procedures and data structures.

Figure 4:
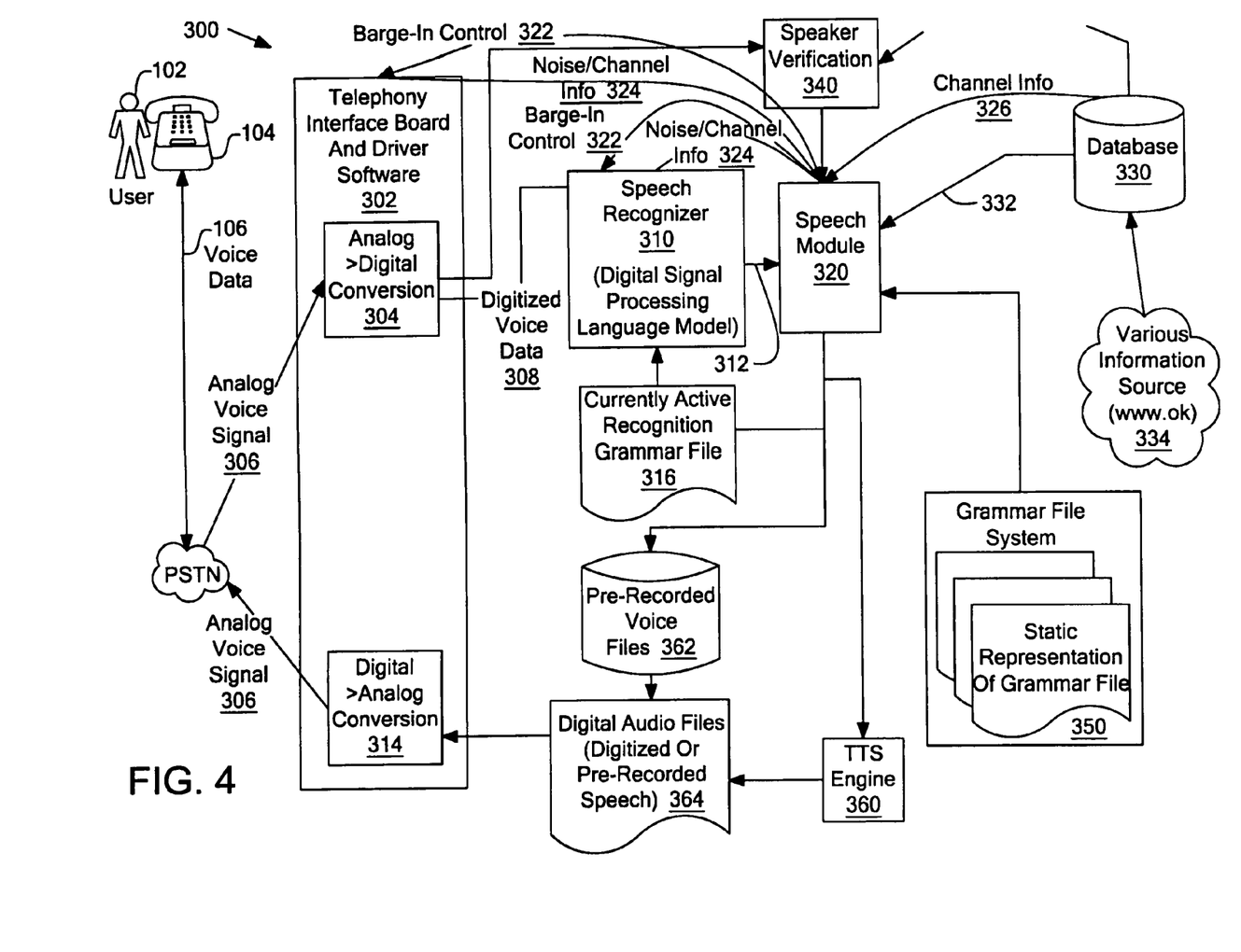
FIG. 4 is a block diagram illustrating the voice recognition system according to an exemplary embodiment of the invention.

FIG. 4 illustrates a voice recognition system 300 in accordance with the teachings of the present invention for utilizing user-specific context information to improve speech recognition in response to speech recognizer uncertainty. The voice recognition system 300 is a component hardware and software implementation of the voice recognition server computer 200, as depicted in FIG. 3. In addition, as described herein, the term context information includes but is not limited to e-mail information, voice-mail information, calendar information and location information regarding user of the voice recognition system 300.

The voice recognition system 300 includes a voice interface board 302 that receives an analog voice signal 306 provided by a user 102 via a voice transmission medium (telephone) 104. The voice interface board 302 is preferably a telephone interface board and driver software as manufactured by the Dialogic® Corporation. However, the voice data 106 provided by the user 102 is not accepted by the voice recognition system 300 until the user 102 is verified by a speaker verification system 340. The speaker verification unit 340 is preferably a speaker verification unit as manufactured by T-Netix® Corporation. Analog voice data 306 is received via the public switch telephone network and is converted to digitized voice data 308 using an analog-to-digital conversion unit 304 which is part of the Dialogic telephony interface board. The digitized voice data 308 is then provided to a speech recognizer 310 (as described above).

The speech recognizer 310 processes the digitized voice data 308 based on a currently active recognition grammar 316. The speech recognizer 310 is, for example, a speech recognizer from SpeechWorks International®. The speech recognizer 310 then generates one or more phrases recognized as a digitized voice data 308 provided by the user 102, which are included in an ASCII text file 312. The speech recognizer 310 is preferably an N-best speech recognition engine (as described above), which generates N-phrases recognized as the voice data 106, including a confidence value associated with each of the N-phrases recognized as the voice data 106 provided by the user 102. A speech module 320 retrieves the representation of the N-phrases 312 from the speech recognizer 310 through an API or other mechanism. This representation 312 includes the one or more phrases recognized as the voice data provided by the user 102. When the representation of the N-phrases 312 includes more than one phrase recognized as the voice data provided by the user 102 (due to voice recognition uncertainty), the speech module selects elements of uncertainty between the phrases recognized as the voice data 106 provided by the user 102. User-specific context information is then selected from a database 330 based on the elements of uncertainty, as described in further detail below.

The database 330 can be any type of database system including but not limited to Microsoft SQL Server, Oracle 8i, or the like. Based on the user-specific context information 332, the speech module 320 is able to intelligently eliminate incorrectly recognized phrases generated by the speech recognizer 310 in order to determine a final phrase recognized as the voice data 106 provided by the user 102. Once this voice data is properly recognized, a speech module 320 can respond to the user using pre-recorded voice files 364 (which may be in the form of voice files, wave files or any other digital format) from a recorded speech database 362. Alternatively, dynamically generated files from a TTS engine 360 may be used. The TTS engine 360 converts text to sounds, in the form of digital audio, which may be in the form of wave file or any other digital format. The TTS engine 360 is preferably manufactured by AT&T® Corporation.

Procedural method steps for implementing the teachings of the present invention are now described.

Operation

Figure 5:
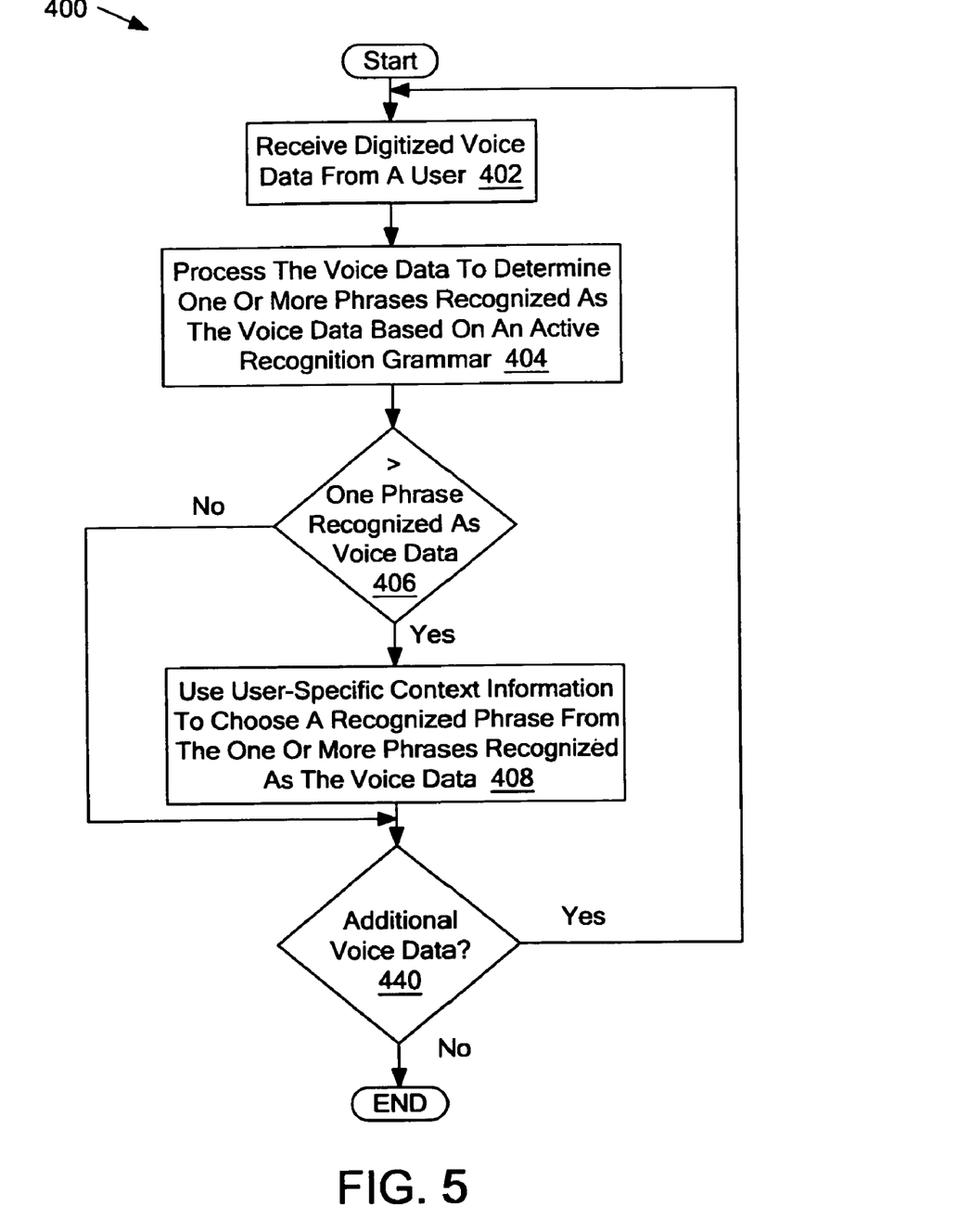
FIG. 5 is a flow chart illustrating the steps used to process voice data utilizing user-specific context information according to an embodiment of the present invention.

Referring now to FIG. 5, a method 400 is depicted for utilizing user-specific context information to improve speech recognition in response to speech recognizer uncertainty, for example, in the voice recognition systems 200 and 300, as depicted in FIGS. 3 and 4. At step 402 the voice data 106 is received from a user 102 via the voice interface 208/302. The voice data 106 is initially received as analog voice data 306 and therefore is converted to a digitized format using the data conversion procedures 214, prior to being processed by the voice recognition system 200/300. At step 404, the voice data 106 is processed by a speech recognizer 310 using speech recognition procedures 218. Using the currently active recognition grammar 316, one or more phrases are recognized by the speech recognizer 310 as the voice data provided by the user 102 using the speech recognition procedures 218. The one or more phrases recognized as the voice data 106 are provided to a speech module 320 as a representation of the N-phrases 312. At step 406, it is determined whether more than one phrase was recognized as the voice data 106 by the speech recognizer 310. At step 408, when more than one phrase is recognized as the voice data, user-specific context information is used to select a recognized phrase from the one or more phrases recognized as the voice data 106 using the CS-natural language procedures 222. At step 440, steps 402–408 are repeated for additional voice data provided by the user 102.

The voice data 106 can be received as analog voice data 306 which is received from the user 102 via a public switch telephone network. Data received in analog format is converted to a digital format prior to being processed by the voice recognition system 300. However, it is within the contemplation of the present invention to receive the voice data via any wireless communications network or any communications network capable of transmitting speech or voice data. In addition, the speech module 320 can be an N-best speech recognition engine. An N-best speech recognition engine, as known in the art, receives voice data and generates N-phrases recognized as the voice data 106, including a confidence value associated with each of the N-phrases when the speech recognition engine encounters uncertainty as to the recognized phrase, usually due to noise in the communication network 110.

Figure 6:
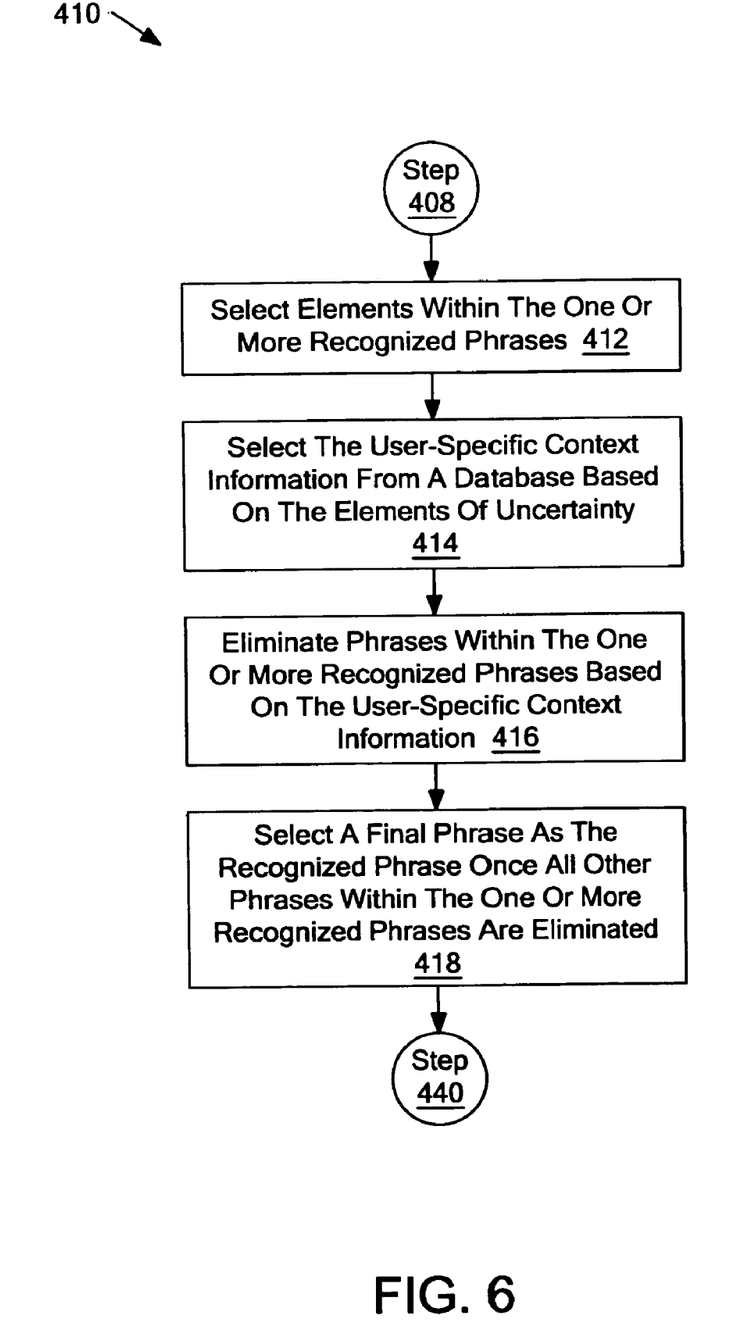
FIG. 6 is a flow chart further illustrating the steps used to process voice data utilizing user-specific context information according to a further embodiment of the present invention.

FIG. 6 depicts additional method steps 410 for using the user-specific context information to choose the recognized phrase of step 408. At step 412, elements of uncertainty within the one or more recognized phrases are selected using the CS-element uncertainty procedures 224. At step 414, user-specific context information is selected from a database 330 based on the elements of uncertainty determined at step 416 using the CS-data access procedures 226. At step 416, phrases are eliminated from the one or more recognized phrases based on the user-specific context information using the CS-phrase elimination procedures 228. Finally, at step 414, a final phrase is selected as the recognized phrase once all other phrases within the one or more recognized phrases are eliminated.

For example, suppose that the currently active recognition grammar 316 is the one described above under the Background section. Accordingly, the voice recognition system 300 receives voice data 106 from a user when the user 102 says "set up a meeting with Fred on Monday." However, due to noise in the communications network 110, the speech recognizer 310 encounters recognition uncertainty as to whether the user said "Fred" or "Frank," but matches everything else cleanly. In accordance with step 412, the CS-element uncertainty procedure 228 would select "Fred" and "Frank" as the elements of uncertainty. However, because the system 300 can utilize context information stored in the database 330, the system 300 knows something about the user 102, and can more intelligently guess the correct outcome for the voice data 106 provided by the user 102. For example, if there is a regularly scheduled meeting with Fred on the user's calendar, but no meeting with anyone named Frank, then it is likely that the user said Fred.

The database 330 has extensive information about the user 102, including e-mail and voice mail messages, calendar information and location information. This user-specific context information can be used in eliminating N-best elements during the natural language understanding portion of the speech module 330 to improve voice recognition. Therefore, in accordance with step 414 and CS-data access procedures 226, the speech module 320 would search the database 330 for meetings with Fred and meetings with Frank. The CS-data access procedures 226 would then return various meetings with Fred and no meetings with Frank. Using this information at step 416, the speech module 320 would eliminate Frank using the CS-phrase elimination procedures 228. Finally at 418, the voice data 106 provided by the user 102 would be recognized as the final phrase: "set up a meeting with Fred on Monday."

Figure 7:
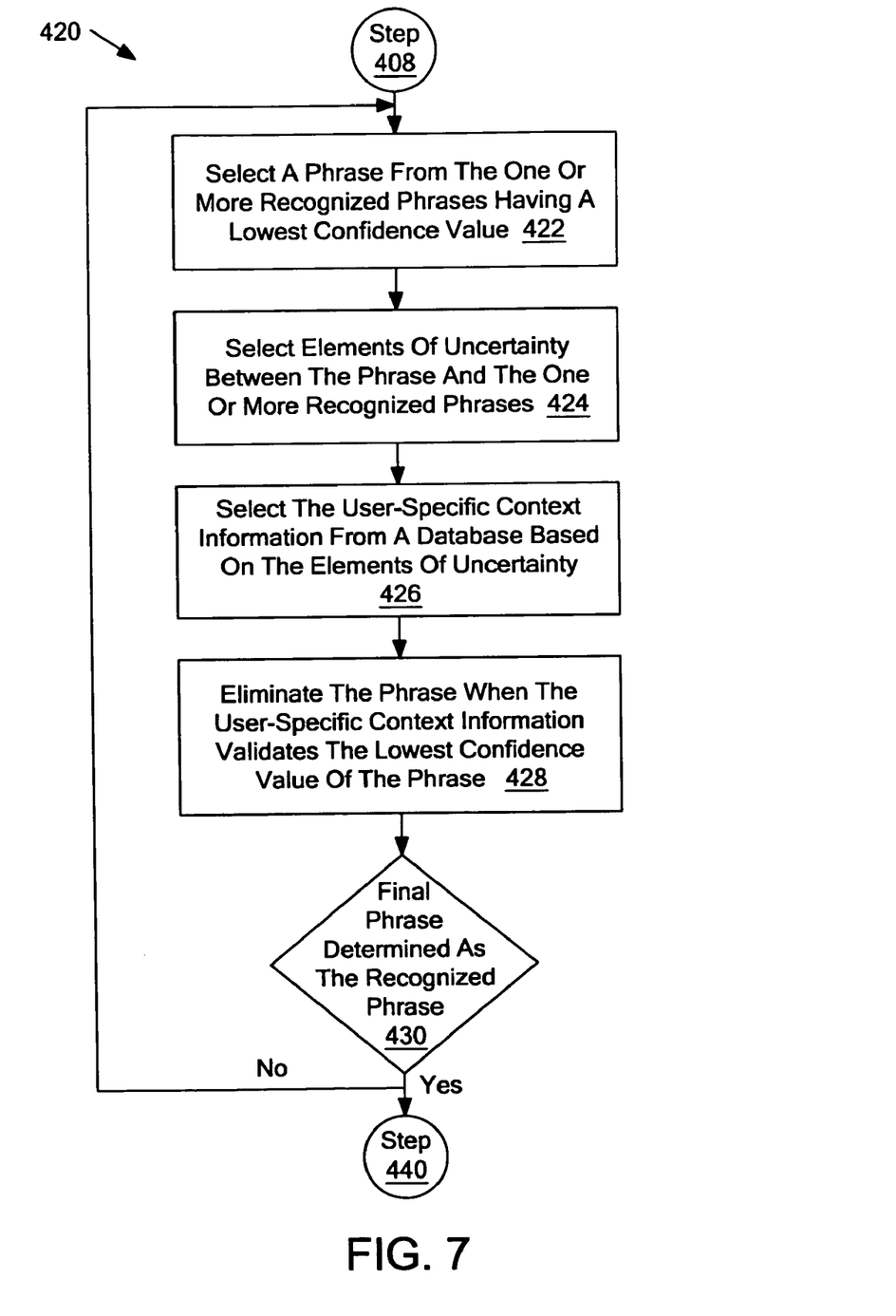
FIG. 7 is a flow chart further illustrating steps for processing voice data utilizing user-specific context information according to an exemplary embodiment of the invention.

FIG. 7 depicts additional method steps 420 for using the user-specific context information to choose a recognized phrase from the one or more phrases recognized as the voice data 106. At step 422, a phrase from the one or more recognized phrases having a lowest confidence value is selected from the N-best list using the CS-natural language procedures 222. At step 424, elements of uncertainty between the phrase and the one or more recognized phrases are selected using the CS-element uncertainty procedures 224. At step 426, user-specific context information is selected from the PIM database 330 based on the elements of uncertainty using the CS-data access procedures 226. Finally, at step 428, a phrase is eliminated from the one or more recognized phrases when the user-specific context information validates the lowest confidence value of the phrase using the CS-phrase elimination procedures 228. At step 430, steps 422–428 are repeated until a final phrase is determined as the recognized phrase.

Several aspects of one implementation of the voice recognition system for utilizing user-specific context information to improve speech recognition in response to speech recognizer uncertainty have been described. However, various implementations of the voice recognition system provide numerous features including, complementing, supplementing, and/or replacing the features described above. Features can be implemented as part of the server or as part of the user's computer system in different implementations. In addition, the invention may be implemented using programmed hardware components.

It is to be understood that even though numerous characteristics and advantages of various embodiments of the present invention have been set forth in the foregoing description, together with details of the structure and function of various embodiment of the invention, this disclosure is illustrative only. Changes may be made in detail, especially matters of structure and management of parts within the principles of the present invention to the full extent indicated by the broad general meaning of the terms in which the appended claims are expressed. For example, the particular element may vary depending on the particular application for the context-sensitive voice recognition system format while maintaining substantially the same functionality without departing from the scope and spirit of the present invention.

In addition, although the preferred embodiment described herein is directed to a voice recognition system receiving voice data via a PSTN, it will be appreciated by those skilled in the art that the teaching of the present invention can be applied to other systems. In fact, systems for wireless communication or any network capable of transmitting analog or digital voice signals are within the teachings of the present invention, without departing from the scope and spirit of the present invention. Additionally, the voice recognition system 200 may be distributed, in arbitrary ways, across a network.

The present invention provides many advantages over known techniques. The present invention includes the ability intelligently use user-specific context information in the event of recognizer uncertainty. The teachings of the present invention provide improved voice recognition accuracy with modification to voice recognition dialogues or voice recognition grammars. In addition, in regards to N-best speech recognizer, the choice for a final recognized phrase is not based solely on the confidence value associated with each phrase. Moreover, the teaching of the present invention enables an intelligent choice when the N-best speech recognizer is equally confident.

Having disclosed exemplary embodiments and the best mode, modifications and variations may be made to the disclosed embodiments while remaining within the scope of the invention as defined by the following claims.

What is claimed is:

1. A method comprising:
   receiving digitized voice data from a user;
   processing the voice data to determine one or more phases recognized as the digitized voice data provided by the user based on a currently active recognition grammar; and
   when more than one phrase is recognized as the digitized voice data provided by the user as a result of voice-recognition uncertainty, using user-specific context information to choose a recognized phrase from the one or more phrases recognized as the digitized voice data, wherein using the user-specific context information further comprises:
   processing the voice data using an N-best speech recognition engine;
   receiving the list of one or more phrases as N-phrases recognized as the voice data provided by the user including a confidence value associated with each of the N-phrases
   selecting a phrase from the one or more recognized phrases having a lowest confidence value;
   selecting elements of uncertainty between the phrase and the one or more recognized phrases;
   selecting the user-specific context information from a database based on the elements of uncertainty;
   eliminating the phrase when the user-specific context information regarding the elements of uncertainty validates the lowest confidence value of the phrase; and
   repeating the selecting, selecting, selecting and eliminating steps until a final phrase is determined as the recognized phrase.

2. A computer readable storage medium including program instruction that directs a computer to function in a specified manner when executed by a processor, the program instructions comprising:
   receiving digitized voice data from a user;
   processing the voice data to determine one or more phases recognized as the digitized voice data provided by the user based on a currently active recognition grammar; and
   when more than one phrase is recognized as the digitized voice data provided by the user as a result of voice-recognition uncertainty using user-specific context information to choose a recognized phrase from the one or more phrases recognized as the digitized voice data, wherein the instructions for using the user-specific context information further causes the machine to:
   process the voice data using an N-best speech recognition engine;
   receiving the list of one or more phrases as N-phrases recognized as the voice data provided by the user including a confidence value associated with each of the N-phrases;
   select a phrase within the one or more recognized phrases having a lowest confidence value;
   select elements of uncertainty between the phrase and the one or more recognized phrases;
   select the user context information regarding the user from a database based on the elements of uncertainty;
   eliminate the phrase when the user-specific context information regarding the elements of uncertainty validates the lowest confidence value of the phrase; and
   repeating the selecting, selecting and eliminating steps until a final phrase is determined as the recognized phrase.

3. A voice recognition system comprising:
   a voice interface to receive digitized data from a user;
   a voice recognition engine to processes the digitized voice data, the voice recognition engine including an N-best speech recognition engine that generates N-phrases recognized as the digitized voice data based on a currently active recognition grammar, the N-best speech recognition engine additionally generating a confidence value associated with each of the N-phrases;
   a database containing user context information; and
   a user context natural language processor having a capability select user-specific context information from the database and use the user-specific context information to choose a recognized phrase from the one or more phrases recognized as the voice data when the voice recognition engine recognizes more than one phrase as the voice data provided by the user, the user context natural language processor further capable of choosing the recognized phrase from the one or more phrases by
   selecting a phrase within the one or more recognized phrases having a the lowest confidence value,
   selecting conflicting elements between the phrase and the one or more recognized phrases,
   selecting the user context information regarding the user from a database, the selection of the user context information based on the conflicting elements previously selected between the phrase and the one or more recognized phrases,
   eliminating the phrase when the user context information regarding the conflict elements validates the lowest confidence value of the phrase; and
   repeating the select, select and eliminate operations until a final phrase is determined as the recognized phrase.

* * * * *